United States Patent Office 2,752,349
Patented June 26, 1956

2,752,349
VAT DYESTUFFS AND PROCESS FOR MAKING SAME

Werner Zerweck and Ernst Heinrich, Frankfurt am Main-Fechenheim, Germany, assignors to Cassella Farbwerke Mainkur Aktiengesellschaft, Frankfurt am Main-Fechenheim, Germany, a German company No Drawing. Application February 9, 1953,
Serial No. 335,992

Claims priority, application Germany February 19, 1952

3 Claims. (Cl. 260—276)

This invention comprises vat dyestuffs and a process for making same.

We have found that valuable vat dyestuffs are obtained when 2-amino-3,4-phthalyl-acridone, which may contain a halogen atom in the 5-, 6-, 7-, or 8-positions, is condensed in a manner usual for the formation of anthrimides, with 1-(3'-halogen-benzoylamino)-anthraquinone which may contain in the 5-position an additional aroylamino group or in the 4,10- or 5,10-positions a pyrimidine ring joined by condensation.

These vat dyestuffs correspond to the general formula

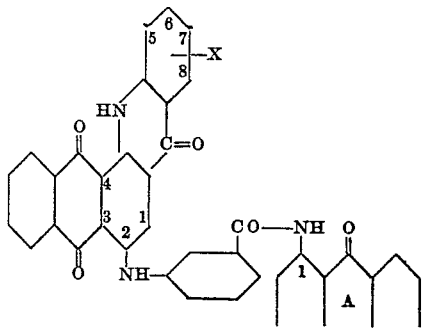

(wherein X means a radical of the group consisting of hydrogen, chlorine and bromine, A means an anthraquinonic radical of the group consisting of anthraquinone, 5-benzoylamino-anthraquinone, 4,10- and 5,10-pyrimidine-anthraquinone). They dye and print cellulose material clear, yellowish green shades of very good fastness properties.

The following example is given for the purpose of illustrating the invention, the parts being given by weight.

Example

A mixture of 400 parts of nitrobenzene, 15 parts of 1-(3'-bromo-benzoylamino)-anthraquinone, 10 parts of 2-amino-3,4-phthalyl-acridone, 5 parts of sodium acetate, 0.5 part of copper acetate and 0.5 part of copper powder are heated to 200° C. for 12 hours. After filtering by suction at a moderate temperature, the residue is washed thoroughly at first with nitrobenzene, then with methanol and finally with hot water. The dried, green dyestuff powder corresponds to the formula

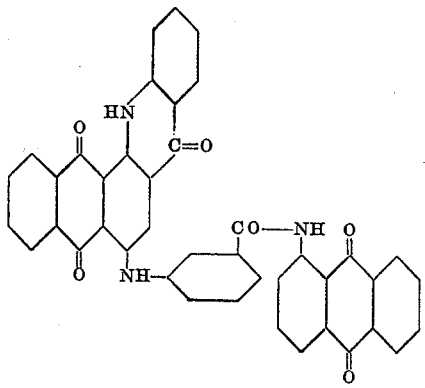

and dissolves in sulfonic acid with a brown color, and dyes and prints the vegetable fiber to clear, yellowish green shades.

If in this example the 2-amino-3,4-phthalyl-acridone is replaced by 2-amino-6-chloro-3,4-phthalyl-acridone or by 2-amino-7-chloro-3,4-phthalyl-acridone, dyestuffs are obtained which dye and print to somewhat more yellowish green shades. The use of 1-(3'-bromo-benzoylamino)-5-benzoylamino-anthraquinone or of 1-(3'-bromo-benzoylamino)-anthrapyrimidine (4,10) instead of 1-(3'-bromo-benzoylamino)-anthraquinone in the aforesaid condensation results in dyestuffs which dye and print the vegetable fiber to substantially more yellowish green shades than does the dyestuff obtained according to the first paragraph of this example.

We claim:

1. Process which comprises reacting an aminophthalyl-acridone of the formula

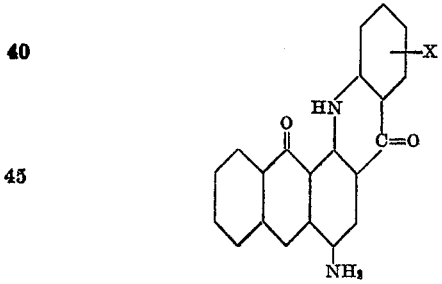

wherein X means a radical of the group consisting of hydrogen, chlorine and bromine, with a halogenbenzoyl-aminoanthraquinone compound of the formula

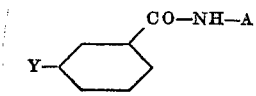

wherein Y means a radical of the group consisting of chlorine and bromine, and A means an anthraquinone radical of the group consisting of anthraquinone and 5-benzoylaminoanthraquinone and wherein the anthraquinone radical is connected to the CONH-group in its 1-position, in nitrobenzene as a solvent in the presence of an acid binding agent and of copper to temperatures of 200° C.

2. Vat dyestuffs of the general formula

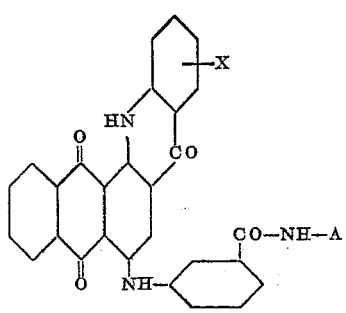

wherein X means a radical of the group consisting of hydrogen, chlorine and bromine, A means an anthraquinonic radical of the group consisting of anthraquinone and 5-benzoylaminoanthraquinone and wherein the anthraquinone radical is connected to the CONH-group in its 1-position.

3. The vat dyestuff of the formula

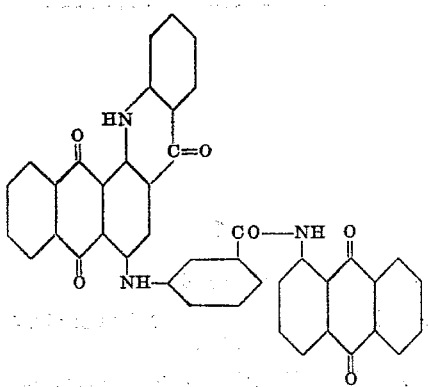

References Cited in the file of this patent

FOREIGN PATENTS 584,819   Great Britain _____ Jan. 23, 1947